Patented July 24, 1951

2,561,780

UNITED STATES PATENT OFFICE 2,561,780

MINERAL OIL COMPOSITIONS CONTAINING THIENYLTHIOALCOHOLS

John W. Brooks, Wenonah, N. J., assignor to Socony-Vacuum Oil Company, Incorporated, a corporation of New York No Drawing. Application September 1, 1948, Serial No. 47,341

6 Claims. (Cl. 252—48.2)

This invention relates to a group of new chemical compounds, namely, the beta-thienylthioalcohols. More specifically, the present invention is directed to an improvement of various mineral oil fractions normally susceptible to the deleterious effects of oxidation by incorporation therein of a minor proportion of a beta-thienylthioalcohol sufficient to stabilize the oil against oxidation.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type, degree of refinement to which the oil has been subjected, and with the conditions under which it is used or tested; that is, the products formed in an oil fraction as a result of oxidation and the degree to which they are formed depend on the extent to which the various unstable constituents or constituents which behave as oxidation catalysts have been removed by refining operations and also upon the conditions of use.

The present invention is predicated upon the discovery that a group of new chemical compounds, the beta-thienylthioalcohols, greatly improve the oxidation characteristics of mineral oil fractions by incorporation therein of minor proportions of these compounds. It has been found that by the addition of a beta-thienylthioalcohol to a viscous mineral oil fraction, the development of undesirable products and properties, such as acid, sludge, discoloration, and corrosiveness toward alloy-bearing metals, normally encountered under conditions of use, has been substantially inhibited.

The compounds of this invention may be designated by the general formula:

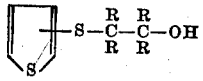

where R represents a hydrogen, alkyl, aryl, aralkyl, or heterocyclic group.

The thio-sulfur linkages of the above compounds may be attached to either the 2-position or the 3-position of the thiophene ring. In the former instance, the compound will be a beta-(2-thienylthio) alcohol and, in the latter instance, a beta-(3-thienylthio) alcohol. It is also contemplated that the thiophene ring may have one or more of its nuclear hydrogen atoms replaced by other substituent groups, such as alkyl, alkoxy, aryl, alicyclic, aralkyl, halogen, and the like.

The beta-thienylthioalcohols described above may suitably be prepared by the reaction of a thiophenethiol with a chlorohydrin in the presence of alkali. Under such conditions, the hydrogen of the mercapto group in the thiophenethiol reacts with the chlorine of the chlorohydrin to split out hydrogen halide and to thus yield the desired beta-thienylthioalcohols. The compounds of this invention may also be prepared by the addition of a thiophenethiol to an unsaturated alcohol in the presence of an alkylation catalyst. The compounds described herein may also be obtained by the addition of a thiophenethiol to suitable olefin oxides, such as ethylene oxide, propylene oxide, etc.

The nature of the alkyl, aryl, aralkyl, or heterocyclic group present in the beta-thienylthioalcohols described herein may be either saturated or unsaturated and may contain various substituents such as those introduced by halogenation, nitration, alkylation, sulfonation, and the like. The alkyl group may be either straight-chained or branch-chained. The aryl, aralkyl, or heterocyclic substituents may be either derived from mononuclear or polynuclear compounds.

The preparation of the compounds of the present invention may be shown by the following typical example, which is given by way of illustration and not intended to be a limitation upon the scope of the invention:

EXAMPLE

*Preparation of beta-(3-thienylthio)ethanol*

Nine hundred twenty-eight grams (8 moles) of 3-thiophenethiol, 648 grams (6 moles) of ethylene chlorohydrin, and 600 milliliters of 95 per cent ethyl alcohol were placed in a flask. A solution composed of 504 grams (9 moles) of potassium hydroxide in 550 grams of water and 900 grams of 95 per cent ethanol was then added at such a rate that the reaction temperature was maintained within the range of 45–50° C. After the addition was completed, the reaction mixture was heated to 80° C. with agitation for a period of 2 hours. The reaction mixture was diluted with 1600 cc. of water and the product separated. The water layer was extracted with ethyl ether. The resulting ether layer was combined with the product, dried over anhydrous magnesium sulfate and distilled under reduced pressure. A product of beta-(3-thienylthio)ethanol was obtained in 72 per cent yield, having a boiling point of 115° C. at a pressure of 0.8 millimeter of mercury and a sulfur content of 40 per cent.

The beta-thienylthioalcohols of this invention have been found to be valuable as additives in the stabilization of petroleum oil fractions, particularly in inhibiting the development of those undesirable products and properties such as acid, sludge, discoloration, and corrosiveness toward alloy-bearing metals, normally encountered under conditions of use. Thus, it is well known that motor oils, especially those refined by certain solvent extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing:

The oil used consisted of Pennsylvania neutral and residuum stocks, separately refined by means of Chlorex and then blended to give a S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface and weighing about 6 grams, and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil and the loss in weight of the bearing section in the inhibited oil can thus be compared directly with the loss in the uninhibited oil. The results obtained in this test employing a minor proportion of the above-described compound as an inhibitor are summarized below:

| | Concentration in Per Cent | Mg. Loss in Wt. |
|---|---|---|
| None | 0 | 20 |
| Beta-(3-thienylthio)ethanol | 0.25 | 1 |

From the foregoing test results, it will be evident that a thienylthioalcohol is an effective stabilizing agent for petroleum lubricating oil fractions. The quantity of compound employed as stabilizer to inhibit the undesirable effects of oxidation in the oil may be varied, depending upon the character of the oil and the severity of the conditions to which it is exposed. Ordinarily, the composition will be added to mineral oil fractions in an amount ranging from about 0.1 to about 5 per cent but may be added in amounts up to 10 per cent by weight in some instances.

It is to be understood that the compounds and oil compositions described above are illustrative only and are not to be construed as limiting the scope of this invention. Thus, in addition to the specific compounds set forth above, other beta-thienylthioalcohols falling within the scope of the above-described general formula may similarly be employed as additives in improving the properties of viscous mineral oil fractions normally subject to deterioration under oxidizing conditions. It is also contemplated that the compounds of this invention may be employed in conjunction with other anti-oxidants, pour-point depressants, V. I. improving agents, or other additives capable of improving the characteristics of mineral oil fractions.

I claim:

1. An improved mineral oil composition comprising a mineral oil and in admixture therewith a minor proportion, sufficient to stabilize said oil against the deleterious effects of oxidation, of a beta-thienylthioalcohol.

2. An improved mineral oil composition comprising a mineral oil and in admixture therewith a minor proportion, sufficient to stabilize said oil against the deleterious effects of oxidation, of a beta-thienylthioethanol.

3. An improved mineral oil composition comprising a mineral oil and in admixture therewith a minor proportion, sufficient to stabilize said oil against the deleterious effects of oxidation, of beta-(3-thienylthio)ethanol.

4. An improved mineral oil composition comprising a mineral oil and between about 0.1 and about 5 per cent by weight of a beta-thienylthioalcohol.

5. An improved mineral oil composition comprising a mineral oil and between about 0.1 and about 5 per cent by weight of a beta-thienylthioethanol.

6. An improved mineral oil composition comprising a mineral oil and in admixture therewith a minor proportion of less than about 10 per cent by weight of beta-(3-thienylthio)ethanol.

JOHN W. BROOKS.

REFERENCES CITED

The following references are of record in the file of this patent:

UNITED STATES PATENTS

| Number | Name | Date |
|---|---|---|
| 2,160,293 | Shoemaker | May 30, 1939 |
| 2,369,908 | McCleary | Feb. 20, 1945 |
| 2,479,295 | Behrens | Aug. 16, 1949 |
| 2,479,513 | Richter | Aug. 16, 1949 |